(12) United States Patent
Hamill et al.

(10) Patent No.: US 11,737,429 B2
(45) Date of Patent: Aug. 29, 2023

(54) SYSTEMS AND METHOD FOR INTERACTIVE DIGGING FOR A PET

(71) Applicant: iFetch, LLC, Austin, TX (US)

(72) Inventors: Deborah Hamill, Austin, TX (US); Grant Hamill, Austin, TX (US); Dennis Hamill, Austin, TX (US); Brad Collins, Austin, TX (US); Andrew Midura, Austin, TX (US); Seo Joon Lee, Austin, TX (US); Kit Morris, Austin, TX (US)

(73) Assignee: iFetch, LLC, Austin, TX (US)

(*) Notice: Subject to any disclaimer, the term of this patent is extended or adjusted under 35 U.S.C. 154(b) by 0 days.

(21) Appl. No.: 17/254,806

(22) PCT Filed: Jun. 21, 2019

(86) PCT No.: PCT/US2019/038485
§ 371 (c)(1),
(2) Date: Dec. 21, 2020

(87) PCT Pub. No.: WO2019/246531
PCT Pub. Date: Dec. 26, 2019

(65) Prior Publication Data
US 2021/0259211 A1    Aug. 26, 2021

Related U.S. Application Data

(63) Continuation-in-part of application No. 29/654,340, filed on Jun. 22, 118, now Pat. No. Des. 893,114.

(60) Provisional application No. 62/729,906, filed on Sep. 11, 2018.

(51) Int. Cl.
*A01K 15/02*    (2006.01)

(52) U.S. Cl.
CPC .................... *A01K 15/025* (2013.01)

(58) Field of Classification Search
CPC .... A01K 15/025; A01K 15/02; A01K 15/026; A01K 1/0353; A01K 1/0157; A47D 9/02; A47D 9/00; A47D 15/008; A47D 15/001
USPC ............................. 119/28.5, 707; 5/5, 98.3
See application file for complete search history.

(56) References Cited

U.S. PATENT DOCUMENTS

| | | | | |
|---|---|---|---|---|
| 5,274,863 A | * | 1/1994 | Fountain | A45F 3/22 5/120 |
| 6,237,531 B1 | * | 5/2001 | Peeples | A01K 1/0353 D30/118 |
| D475,504 S | | 6/2003 | Hodgdon | |
| D571,929 S | | 6/2008 | Palmer | |

(Continued)

OTHER PUBLICATIONS

International Search Report issued in PCT/US2019/038485 dated Sep. 13, 2019, 2 pages.

(Continued)

*Primary Examiner* — Peter M Poon
*Assistant Examiner* — Jeffrey R Larsen
(74) *Attorney, Agent, or Firm* — Polsinelli PC

(57) ABSTRACT

A pet apparatus is provided which includes a housing including internal walls forming a cavity. The internal walls include a plurality of apertures. One or more panels are disposed within the cavity. Each of the panels includes at least one pocket configured to receive a toy and/or a treat. Toggles are coupled with each of the panels and are configured to be inserted into the plurality of apertures to removably couple the panels with the housing.

20 Claims, 20 Drawing Sheets

(56) References Cited

U.S. PATENT DOCUMENTS

| | | | |
|---|---|---|---|
| D822,312 S | 7/2018 | Williams | |
| D825,865 S | 8/2018 | Abbey | |
| D853,053 S | 7/2019 | O'Donnell | |
| 2001/0047770 A1* | 12/2001 | Pontes | A01K 15/025 119/707 |
| 2004/0148700 A1* | 8/2004 | Brereton | A47D 9/005 5/102 |
| 2007/0044722 A1 | 1/2007 | Schenk | |
| 2008/0216234 A1* | 9/2008 | Tatsuno | A47G 9/086 5/413 R |
| 2009/0178197 A1* | 7/2009 | Swihart | A47G 9/02 5/502 |
| 2012/0060278 A1 | 3/2012 | Mccurdy | |
| 2016/0330935 A1* | 11/2016 | Vesterholt | A01K 1/0157 |
| 2018/0368355 A1* | 12/2018 | Repins | A01K 1/0353 |

OTHER PUBLICATIONS

Written Opinion issued in PCT/US2019/038485 dated Sep. 13, 2019, 6 pages.

IDig: The First Ever Digging Toy From iFetch,  posted at youtube.com, earliest date posted Jul. 2, 2018, [online], acquired on Jan. 3, 2020, Available on internet. URL:https://222.youtube.com/watch?v=ThSlaMH8JNw (Year: 2018).

The iDig—Is It Worth the Money? | Rover.com,  posted at youtube.com, earliest date posted Jan. 11, 2019, [online], acquired on Jan. 3, 2020, Available on internet. URL:https://www.youtube.com/watch?v=Ae0JteLp-tY (Year: 2019).

* cited by examiner

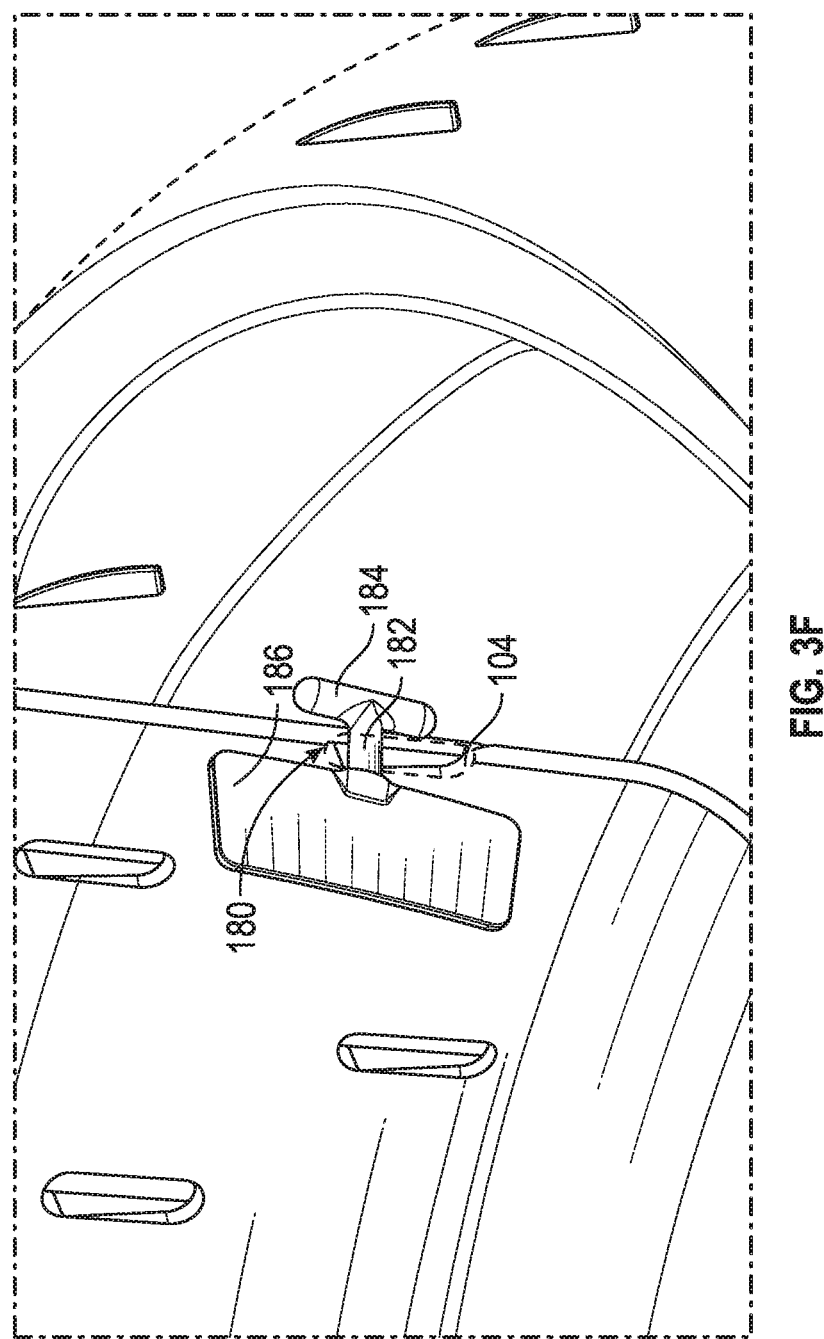

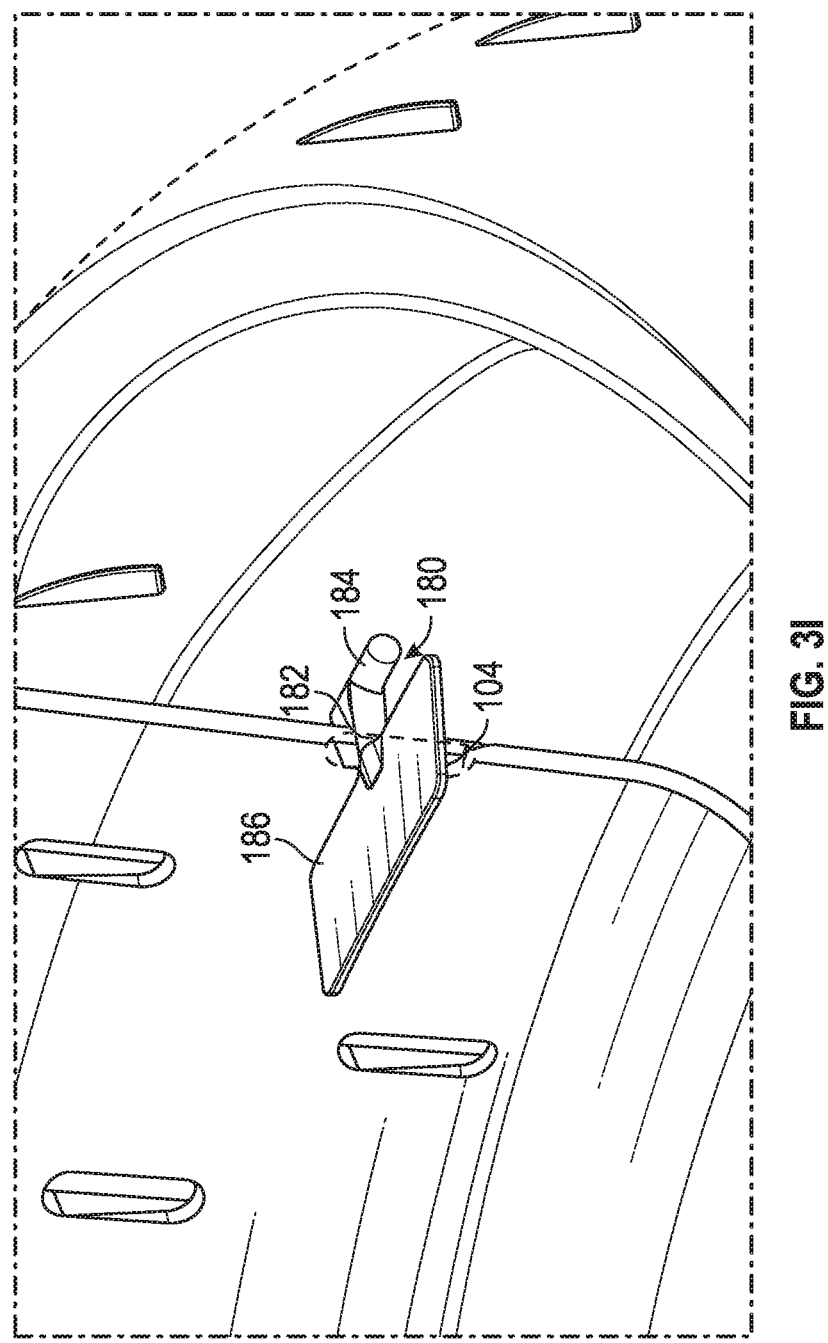

SYSTEMS AND METHOD FOR INTERACTIVE DIGGING FOR A PET

CROSS REFERENCE TO RELATED APPLICATIONS

The present application is a continuation-in-part of and claims priority to U.S. Design Application No. 29/654,340, entitled "Digging Device" and filed on Jun. 22, 2018. The present application further claims priority to U.S. Provisional Application No. 62/729,906, entitled "Pet Apparatus" and filed on Sep. 11, 2018. Each of these applications is incorporated by reference herein in its entirety.

FIELD

The present disclosure relates generally to pet apparatuses. In particular, the present disclosure relates to systems and methods for interactive digging for a pet, including one or more panels to stimulate pets by simulating digging.

BACKGROUND

Pets such as dogs need physical as well as mental stimulation to remain healthy and happy. For example, many dogs have instincts to dig. However, dogs may not have an outlet for their desire to dig, as digging in yards are often frowned upon and there are no suitable places for digging inside a house or apartment. As such, an apparatus or a toy which simulates digging can provide physical and mental stimulation for dogs as well as provide a positive outlet for dogs' innate desires to dig.

BRIEF DESCRIPTION OF THE DRAWINGS

Implementations of the present technology will now be described, by way of example only, with reference to the attached figures, wherein:

FIGS. 3A-3I illustrate installation of a toggle into an example of an aperture in a housing to couple a panel with the housing of the pet apparatus;

DETAILED DESCRIPTION

Figure 1A:
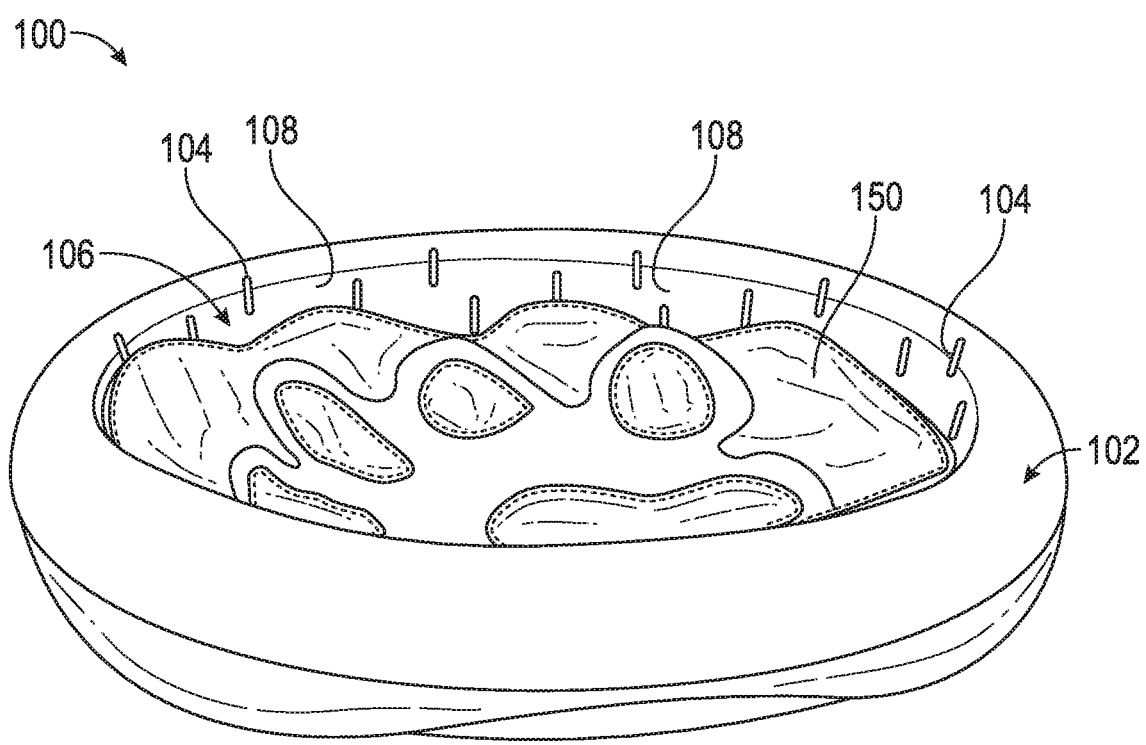
FIG. 1A is a diagram illustrating a perspective view of an exemplary pet apparatus according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected.

Disclosed herein is a pet apparatus. The pet apparatus includes a housing which has internal walls that form a cavity or a recess. The internal walls include a plurality of apertures. One or more panels can be disposed within the cavity. The panels can be coupled to the housing by inserting toggles through the apertures. The toggles, after being inserted through the apertures, are shaped such that the toggles are not easily removed unless positioned in specific sequences of orientations. For example, the toggles have a length that is greater than the length of the apertures. As such, the pet cannot easily or accidentally remove the toggles to de-couple the panels from the housing.

The panels include one or more pockets. The pockets can be one or more different configurations and are configured to receive a toy and/or a treat. The pet is motivated to reach the toy and/or treat within the pocket. The different configurations of pockets provide different obstacles for the pet to overcome to reach the toy and/or treat contained therein. To do so, the pet needs to dig or manipulate the panels in such a way to reveal and open the pocket. For example, a panel may be disposed within the cavity in such a position that the pocket is facing towards the bottom of the housing. As such, the pet needs to flip or fold over the panel to gain access to the pocket. The pet will need to dig and manipulate the pocket to flip or fold the panel. By changing the order and/or orientations of the panels, the pet apparatus provides many configurations to keep the pet engaged. As such, the pet is mentally and physically stimulated.

Figure 1B:
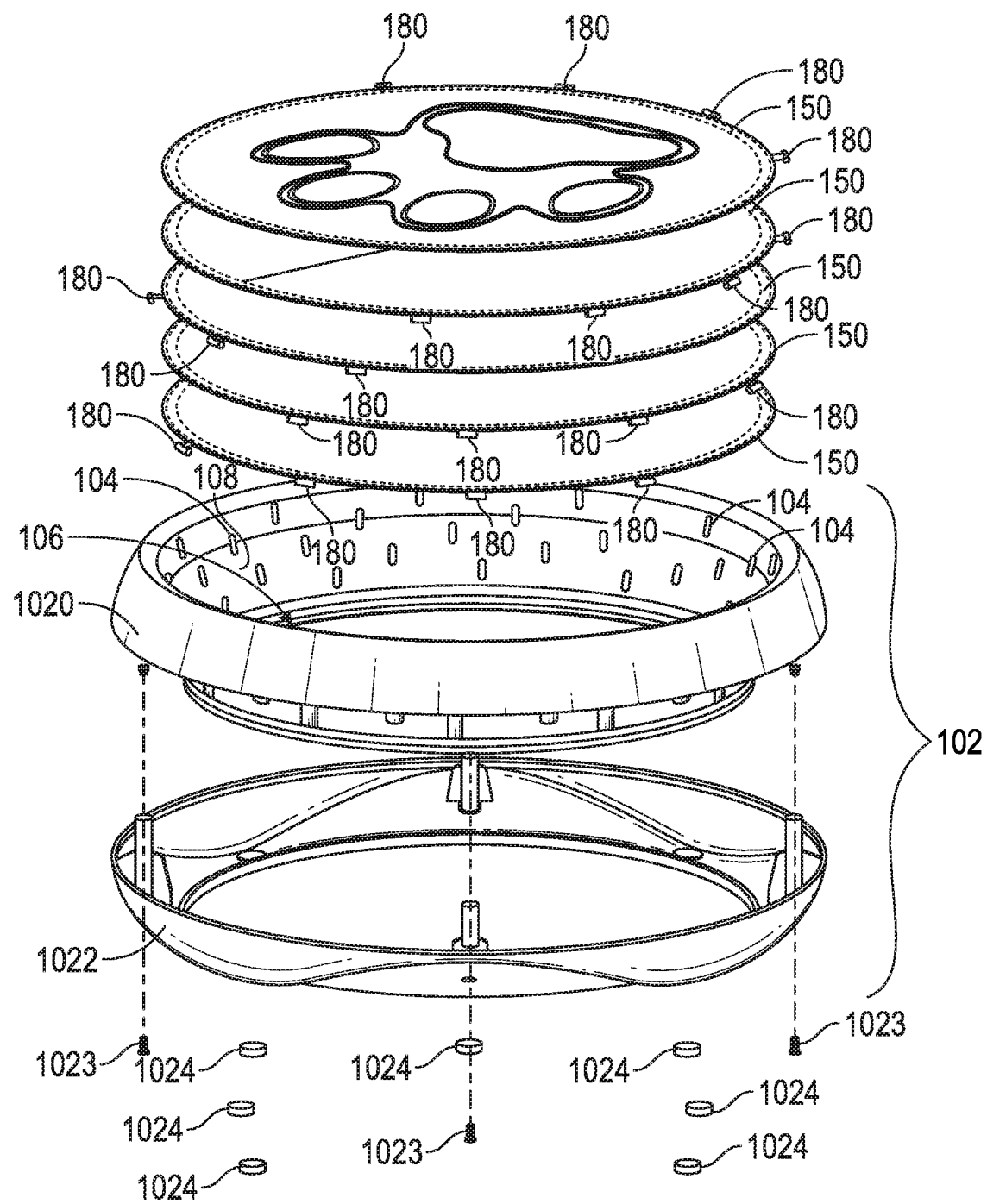
FIG. 1B is a an exploded view of the exemplary pet apparatus of FIG. 1A.

The pet apparatus can be employed as an exemplary apparatus 100 shown, for example, in FIGS. 1A and 1B. The apparatus 100 is a toy which is suitable for use by pets, such as dogs. The apparatus 100 includes a housing 102 which forms a cavity 106. Internal walls 108 of the housing 102 forms the cavity 106 and include apertures 104 dispersed throughout the internal walls 108. As the exemplary apparatus 100 illustrated in FIGS. 1A and 1B, the housing 102 includes a top portions 1020 and a bottom portion 1022. The bottom portion 1022 is configured to be coupled with the top portion 1020 by one or more fasteners 1023. The fasteners 1023 can be screws, nails, nuts and bolts, adhesive, hook and loop fasteners, and/or any other suitable fasteners. In at least one example, the housing 102 is one piece and is not split into a top portion 1020 and a bottom portion 1022. The top portion 1020 and the bottom portion 1022 can each be made of a plastic. In other examples, at least one part of the top portion 1020 and/or the bottom portion 1022 can be made of other suitable materials such as fabric, metal, and/or rubber. One or more feet 1024 can be coupled to the bottom side of the bottom portion 1022. The feet 1024 can be made of, for example, rubber to resist sliding along the floor and/or to resist scratching or damaging the floor.

The apparatus 100 also includes one or more panels 150. The panels 150 are configured to be disposed within the cavity 106, and as discussed in further detail below in FIGS. 2A-2D, include one or more pockets to receive a toy and/or a treat. The panels 150 can be made of any flexible material, such as fabrics and/or polymers, which allow the panels 150 to be folded. The panels 150 can also be scratch resistant such that the panels 150 can be re-used multiple times and withstand scratching and digging by pets. Each panel 150 can have one or more different configurations of pockets to provide different obstacles for the pet to overcome to obtain the toy and/or treat contained within the pockets. As such, the pet is mentally and physically stimulated since the pet may encounter many different combinations of obstacles to obtain the toy and/or treat. As illustrated, the apparatus 100, including the housing 102 and the panels 150 are substantially circular. In other examples, the housing 102 and/or the panels 150 can be any other suitable shape, such as ovoid, triangular, rectangular, or polygonal.

A plurality of toggles 180 are coupled with each of the panels 150. The toggles 180 can be inserted into the apertures 104 to removably couple the panels 150 with the housing 102. The toggles 180 are shaped such that the insertion and removal of the toggles 180 from the housing 102 requires a sequence of steps as discuss below in FIGS. 3A-3I. As such, the toggles 180 cannot be easily removed from the housing 102 by the pet, requiring more effort to flip and/or fold the panels 150 to gain access to the toy and/or treat. As illustrated in FIGS. 1A and 1B, the housing 102 includes a plurality of apertures 104 which are disposed along the internal walls 108 in a plurality of rows. The plurality of rows of apertures 104 permits the panels 150 to be disposed within the cavity 106 in one or more layers. The layers of panels 150 provide an environment where the pet simulates digging to reach the toys and/or treats within each panel 150.

FIGS. 2A-2D illustrate different examples of panels 150 with different exemplary configurations of pockets 1500. While FIGS. 2A-2D illustrate the panels 150 as having one exemplary configuration of pockets 1500, the panels 150 can have any combination of pockets 1500 illustrated, for example, in FIGS. 2A-2D as desired. In at least one example, other obstacles can be included such as hook and loop fasteners and/or magnetic fasteners which make it more difficult to open the pockets 1500.

Figure 2A:
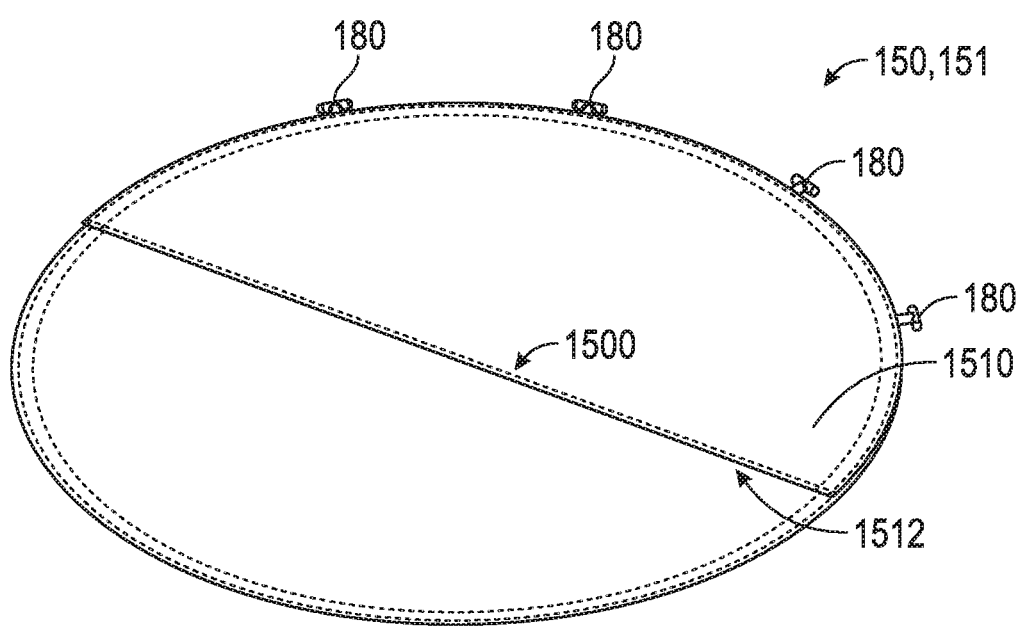
FIG. 2A is a diagram illustrating a perspective view of a first example of a panel which can be deployed in the pet apparatus.

FIG. 2A illustrates an exemplary first panel 151. The first panel 151 includes a pocket 1500. The pocket 1500 in the first panel 151 is a single pocket which includes a single flap 1510 forming a single opening 1512. The single flap 1510 is fastened to the panel 150 along the perimeter of the flap 1510 and is not fastened to the panel 150 along at least one side to form a single opening 1512. In the example illustrated in FIG. 2A, the flap 1510 is substantially semi-circular. The circular portion of the flap 1510 corresponds to the external perimeter of the panel 151 and is fastened, for example by sewing, to the panel 150. The straight portion of the flap 1510 is not fastened to the panel 150 such that the first opening 1512 is formed, creating the pocket 1500.

Figure 2B:
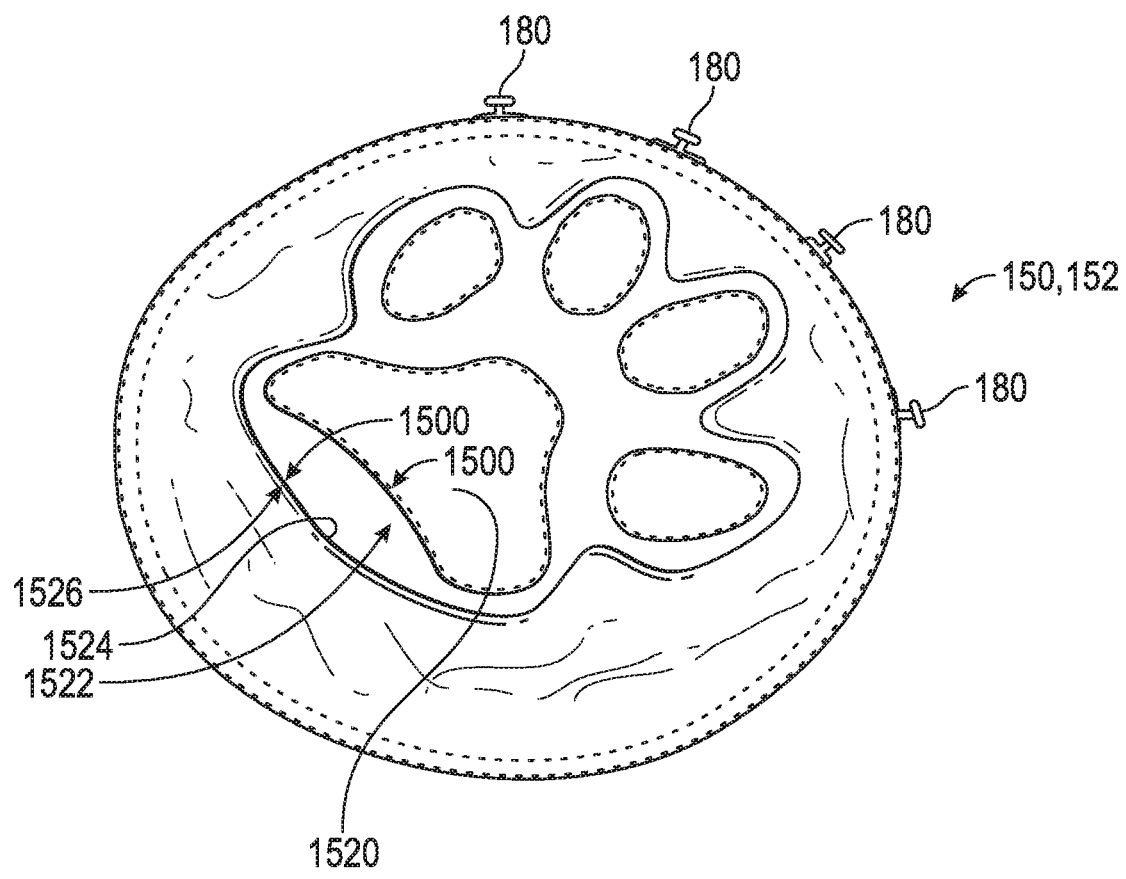
FIG. 2B is a diagram illustrating a perspective view of a second example of a panel which can be deployed in the pet apparatus.

The shape and/or size of the flap 1510 can be adjusted as desired. For example, as illustrated in FIG. 2B, the exemplary panel 152 includes two pockets 1500. Both pockets 1500 are single pockets, as discussed in FIG. 2A. However, the size and shape of the pockets 1500 are different. The panel 152, as illustrated in FIG. 2B, has a paw design which includes five pads. One of the pads includes a panel 1520 which forms an opening 1522, creating a pocket 1500. In other examples, any of the pads can be pockets 1500. Additionally, the panel 152, as illustrated in FIG. 2B, includes another pocket 1500 formed by panel 1524 and opening 1526. As such, panel 152 includes two single pockets 1500 in different shapes and sizes configured to receive toys and/or treats to provide different obstacles for the pet.

Figure 2C:
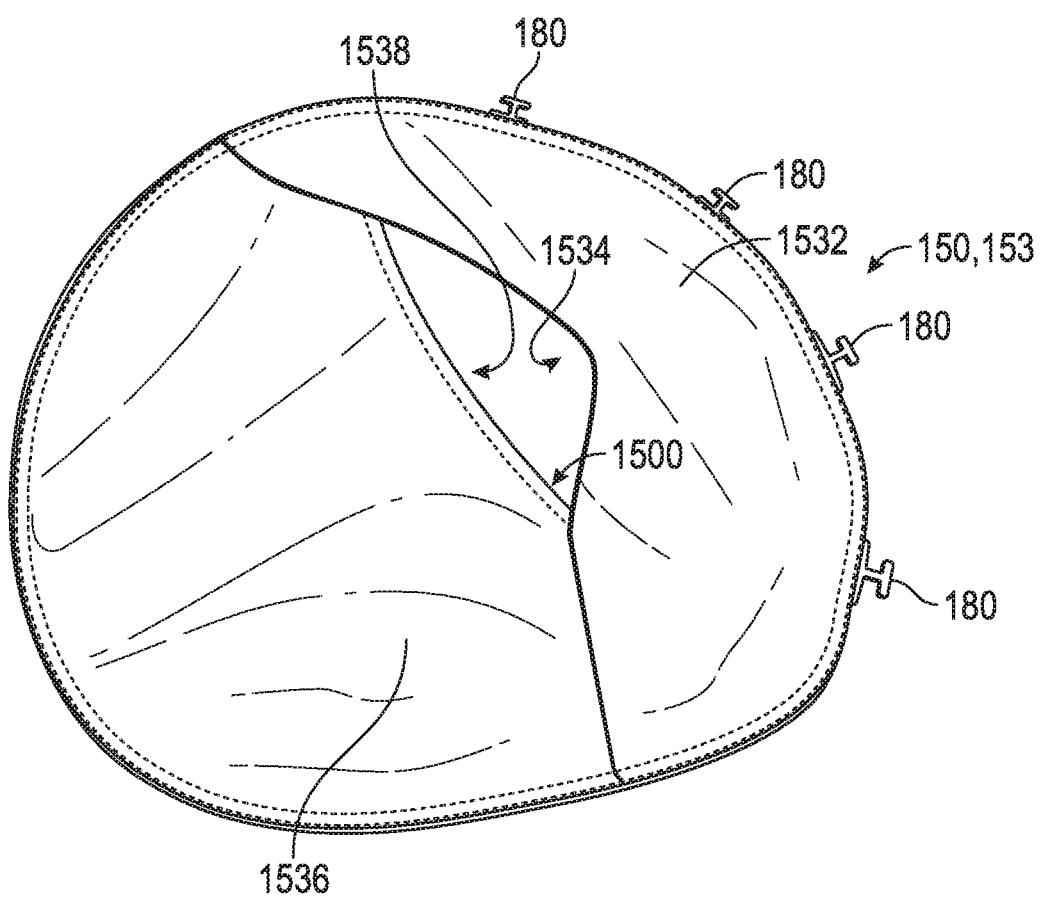
FIG. 2C is a diagram illustrating a perspective view of a third example of a panel which can be deployed in the pet apparatus.

FIG. 2C illustrates a panel 153 which includes a double pocket configuration of a pocket 1500. The double pocket includes a first flap 1532 forming a first opening 1534 and a second flap 1536 forming a second opening 1538 facing a direction opposite the first opening 1534. The first flap 1532 at least partially overlaps the second flap 1536 such that the second opening 1538 is not accessible unless the first opening 1534 is opened. As such, the double pocket configuration provides a more difficult obstacle for the pet to access the toy and/or treat deposited within the double pocket.

Figure 2D:
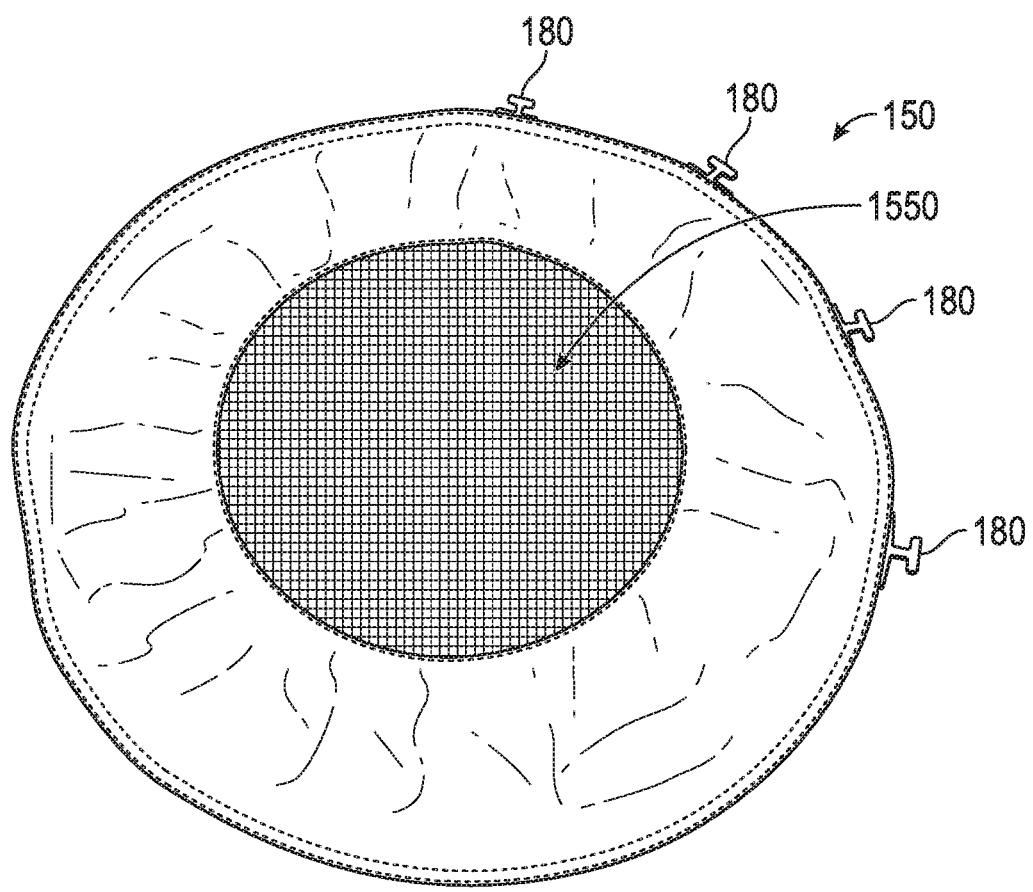
FIG. 2D is a diagram illustrating a perspective view of a fourth example of a panel which can be deployed in the pet apparatus.

FIG. 2D illustrates a panel 150 which includes a screen 1550. The screen 1550 can be a mesh screen which permits visibility to the inside of the pockets 150. As such, the pet may see the toy and/or treat within the pocket 1500 and may scratch or dig at the screen 1550 to reach the toy and/or treat; however, the pet cannot access the toy and/or treat through the screen 1550. The pet has to flip and/or fold the panel 150 to reach the pocket 1500 on the opposite side of the panel 150 from the screen. In at least one example, each panel 150 may include a screen 1550. In other examples, only some of the panels 150 include a screen 1550. In yet other examples, none of the panels 150 include a screen 1550.

The panels 150 can be placed within the housing 102 in any orientation or configuration as desired. For example, panels 150 can be placed with the pocket 1500 facing upward or with the pocket 1500 facing downward. Each panel 150 can be placed in the same or different orientations. As such, the multitude of configurations of the apparatus 100 provides for different levels of obstacles to keep the pet interested and mentally stimulated.

As can be seen in FIGS. 2A-2D, the panels 150 include toggles 180 arranged partially around the perimeter of the panels 150. Each panel 150, as illustrated in FIGS. 2A-2D, includes four toggles 180 arranged around less than half to the perimeter of each of the panels 150. In other examples, each panel 150 can include more or less than four toggles 180 as desired. The panels 150 are not coupled with the housing 102 around the entire perimeter of the panels 150. As such, the panels 150 can be folded and/or flipped by the pet to access a panel 150 layered below and/or to access a pocket 1500 situated on the bottom side of the panel 150.

FIGS. 3A-3I illustrate a method to insert the toggles 180 into the apertures 104 of the housing 102. The toggles 180 include a base 186, an extension 182, and an arm 184. The base 186 is coupled with the panels 150, for example by portions of the panel 150 being sewn around the base 186. In other examples, the base 186 can be coupled to the panels 150 by any other suitable method, such as adhesives, threaded engagement, and/molding. The extension 182 extends from the base 186 and connects the base 186 to the arm 184. In at least one example, the toggle 180 does not include a base 186 and the extension 182 radially extends directly from the panels 150. The arm 184 extends substantially perpendicularly from the extension 182. In other examples, the arm 184 can extend at an angle from the extension 182.

The arm 184 has a length 184L which is greater than the width 104W of the arm 104. As illustrated in FIGS. 3A-3I, the arm 184 is substantially pill shaped. The arm 184 can be substantially cylindrical, substantially a rectangular prism, or any other suitable shape. In other examples, the arm 184 can be bendable such that the arm 184 can bend on either side of the extension 182 towards the extension 182 to lessen the functional length of the arm 184. The bendable arm 184 can be configured to only bend in on direction and resist bending in the opposing direction such that the arm 184 can be inserted into the aperture 104 but resist bending in the opposing direction to be removed from the housing 102.

Additionally, the length 184L of the arm 184 is greater than the length 104L of the aperture 104. In at least one example, the length 104L of the aperture 104 is about 0.75 times the size of the length 184L of the arm 184. Conversely, the length 184L of the arm 184 may be about 1.33 times the length 104L of the aperture 104. For example, the length 104L of the aperture 104 can be about 13.48 millimeters (mm), and the arms' length 184L can be about 18.25 mm. As such, the arm 184 must be inserted through the aperture 104 at an angle, and the toggle 180 is difficult to be removed from the housing 102 once the arm 184 is inserted through the aperture 104.

Figure 3A:
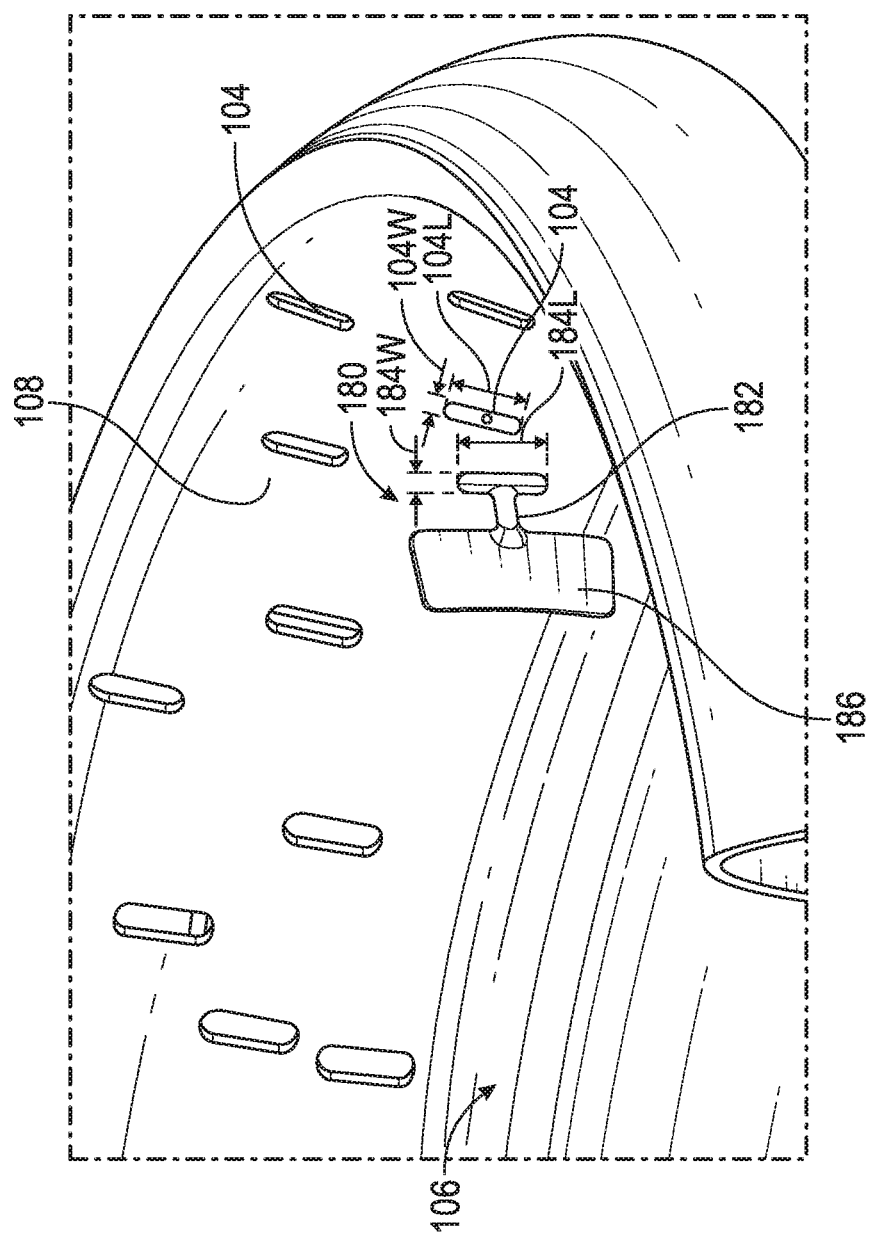
Figure 3B:
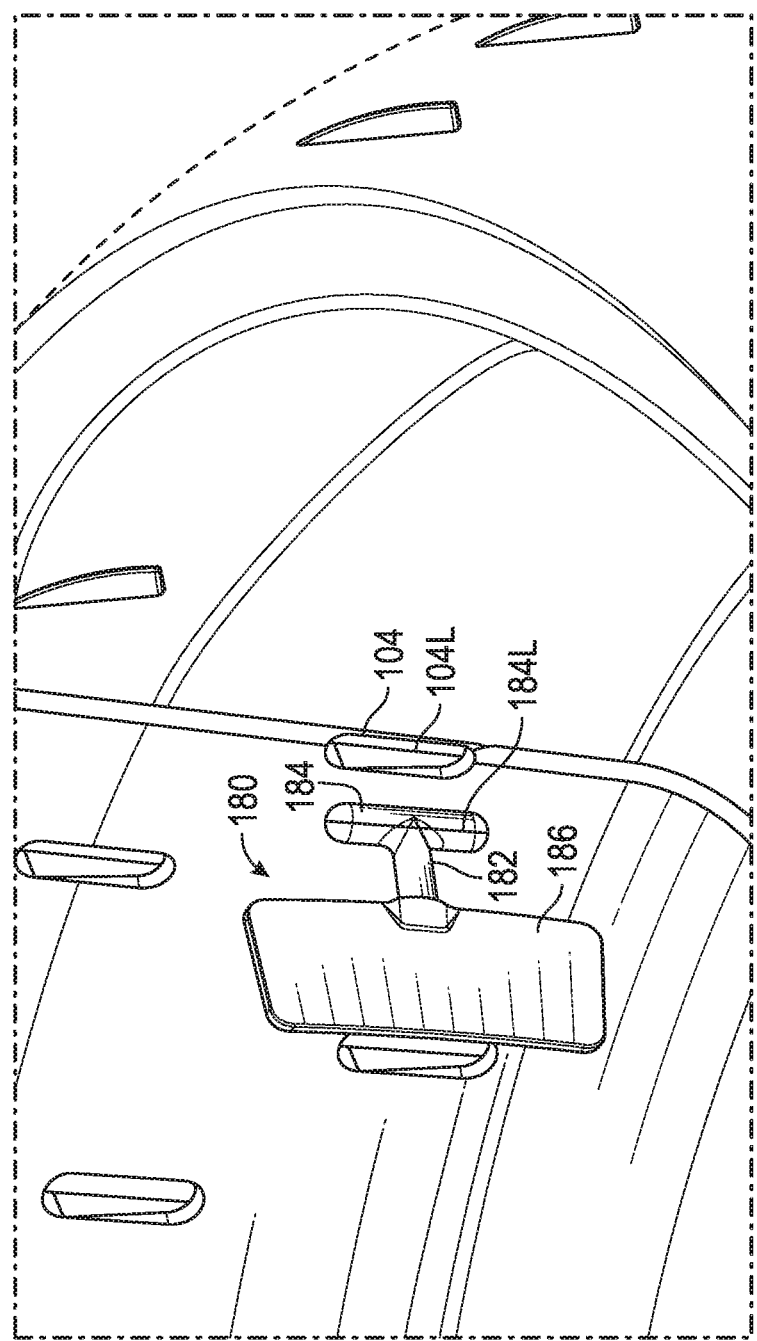
Figure 3C:
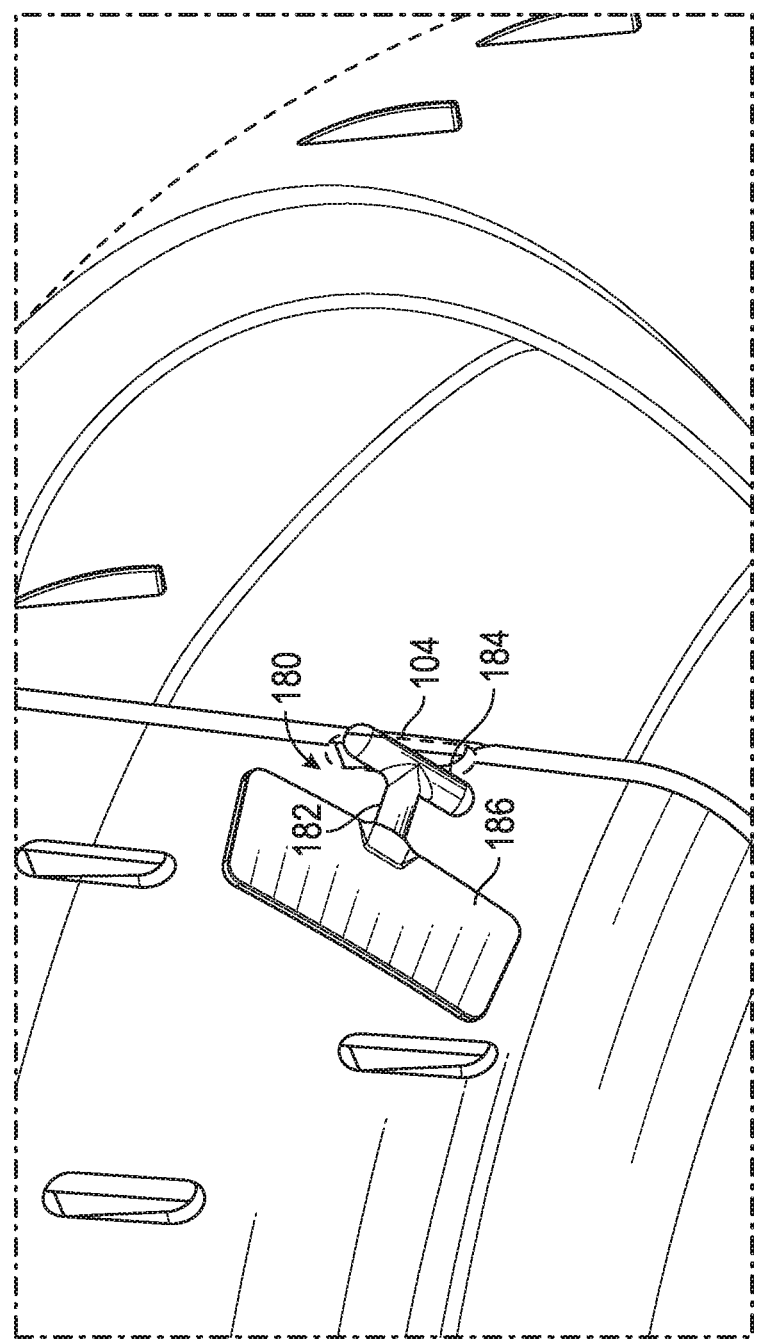
Figure 3D:
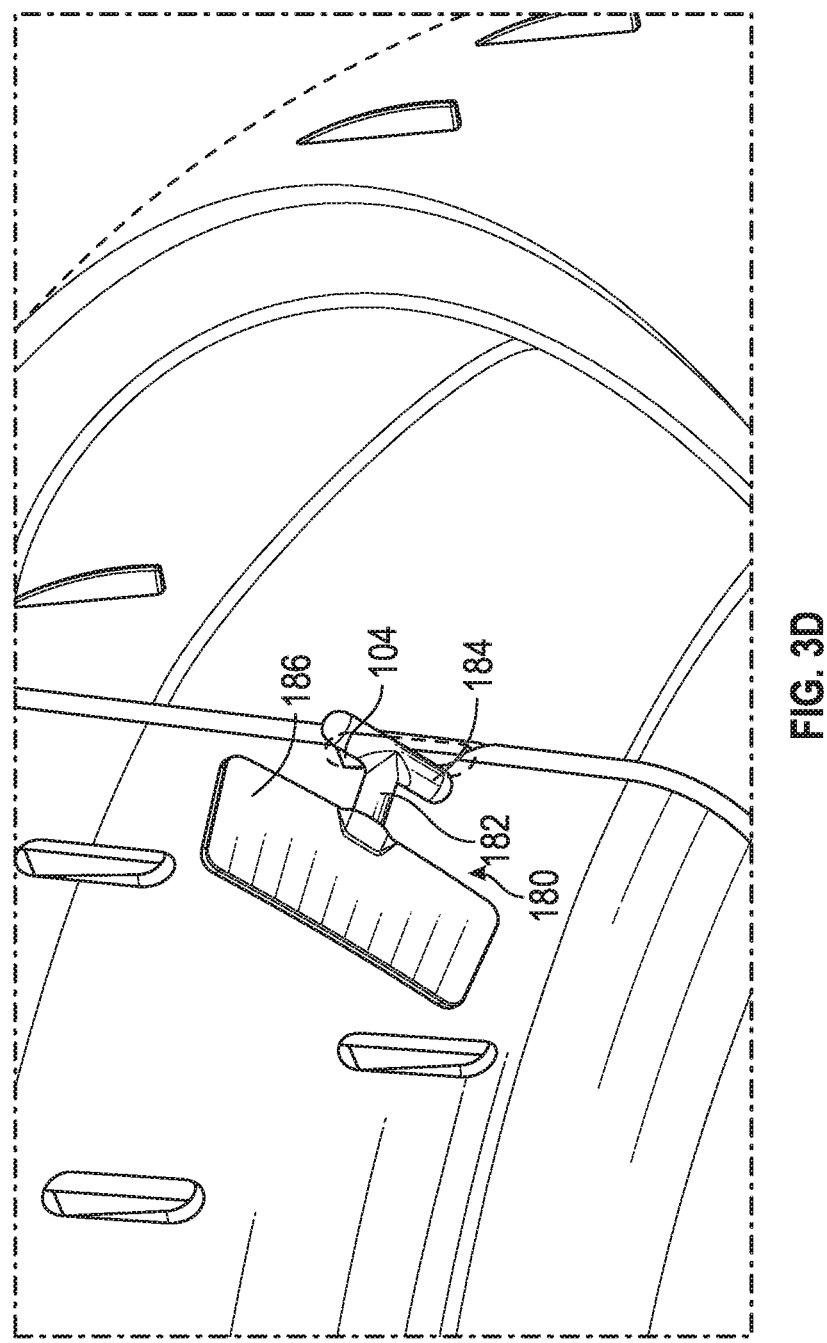
Figure 3E:
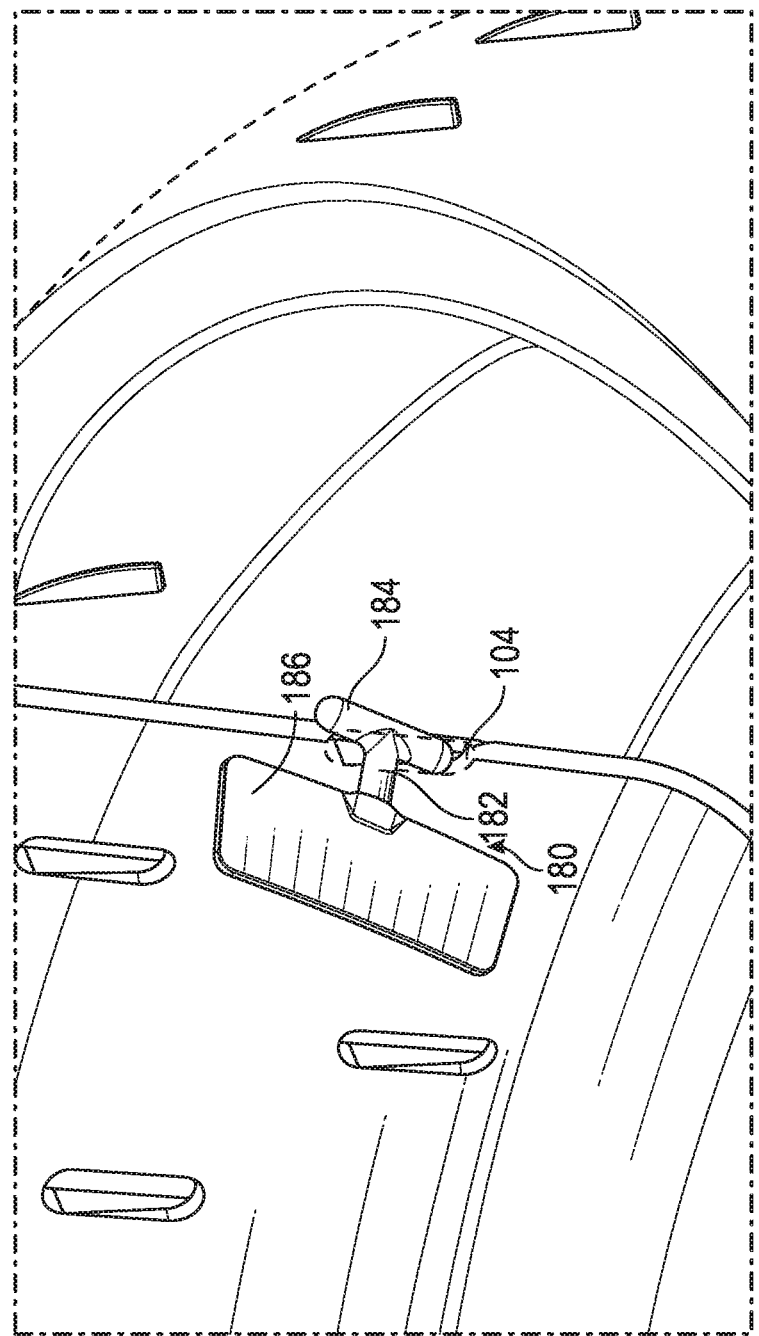
Figure 3G:
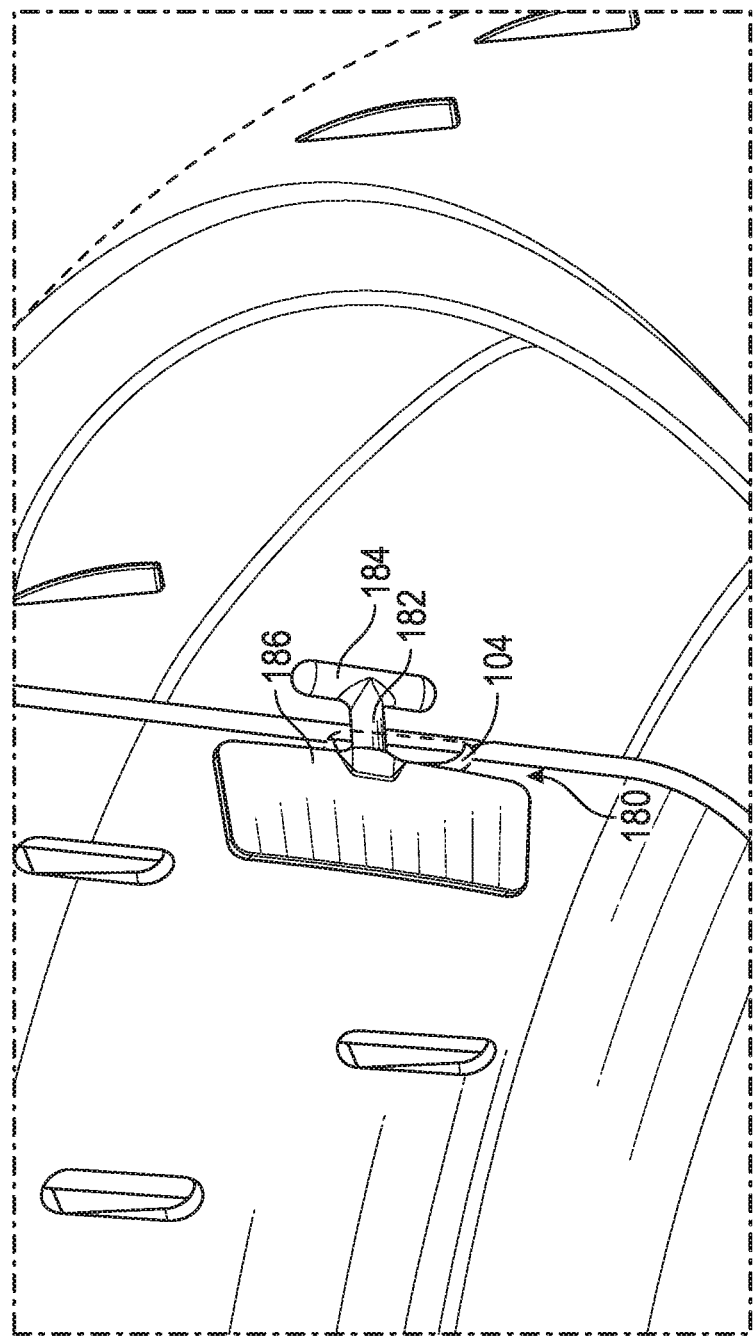
Figure 3H:
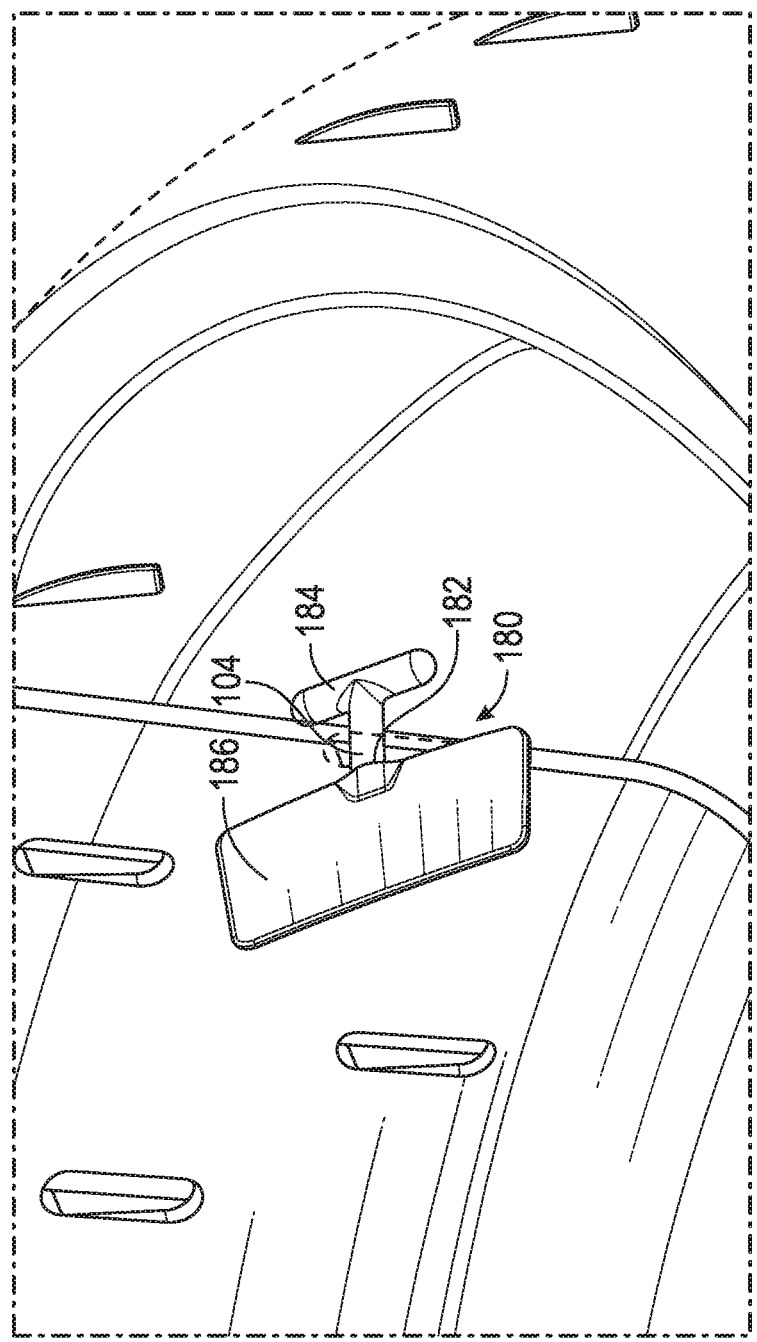

FIG. 3B illustrates the toggle 180 being lined up with the aperture 104. As illustrated, the toggle's arm 184 has a length 184L greater than the length 104L of the aperture 104. As shown in FIG. 3C, to insert the arm 184 through the aperture 104, the toggle 180 is tilted along the length 184L of the arm 184. As shown in FIG. 3D, one side of the arm 184 is inserted through the aperture 104, and as shown in FIG. 3E, the other side of the arm 184 is inserted through the aperture 104 while substantially maintaining the angle. When the arm 184 is fully inserted through the aperture 104, as shown in FIGS. 3F and 3G, the toggle 180 is returned to its original orientation. As the length 184L of the arm 184 is greater than the length 104L of the aperture 104, the toggle 180 cannot be removed from the housing 102 without once again tilting the toggle 180 to the correct angle while withdrawing the toggle 180. As shown in FIGS. 3H and 3I, the toggle 180 is rotated about the extension 182 such that the arm 184 is at an angle in relation to the length 104L of the aperture 104. In at least one example, the arm 184 can be substantially perpendicular to the length 104L of the aperture 104. The width 104W of the aperture 104 is less than the length 184L of the arm 184. Accordingly, the arm 184 abuts against the opposing side of the housing 102 and cannot easily be withdrawn from the housing 102 unless the sequence illustrated in FIGS. 3A-3I is conducted in reverse order.

Figure 4:
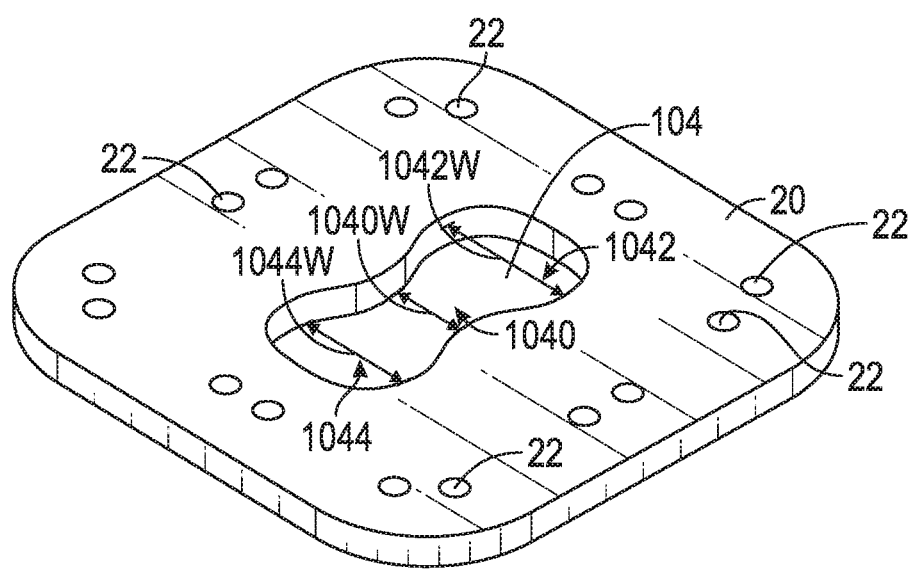
FIG. 4 is a diagram illustrating a perspective view of another example of an aperture in a fastener to be coupled with the housing.

As illustrated in FIGS. 1A-3I, the apertures 104 are substantially pill shaped. The apertures 104 can be any other suitable shape, such as rectangular, triangular, or ovoid. In other examples, as illustrated in FIG. 4, the apertures 104 can have irregular shapes. For example, the apertures 104 can have a middle section 1040 and two opposing end sections 1042, 1044. The middle section 1040 can have a width 1040W that is smaller than the widths 1042W, 1044W of the two opposing end sections 1042, 1044. The widths 1042W, 1044W of the two opposing end sections 1042, 1044 can be substantially the same, and the apertures 104 can be in the shape of an hourglass. In other examples, the widths 1042W, 1044W can be different. The width 1040W of the central portion 1040 and the widths 1042W, 1044W of the two opposing end sections 1042, 1044 are greater than the width 184W of the arm 184 and less than the length 184L of the arm 184.

Additionally, the apertures 104 as illustrated in FIGS. 1A-3I are formed in the internal walls 108 of the housing 102. In other examples, as illustrated in FIG. 4, the apertures 104 can be formed in a frame 20 which is coupled with the housing 102. The frame 20 can include holes 22 through which fasteners such as thread, screws, and/or nails can fasten the frame 20 to the housing 102. The frame 20 can also be coupled with the housing 102 by other methods, such as adhesives and/or hook and loop fasteners.

The frame 20, for example as illustrated in FIG. 4, can be implemented in the exemplary apparatus 100 as illustrated in FIGS. 5A-5G. The exemplary apparatus 100 as illustrated in FIGS. 5A-5G is made of fabric and/or flexible polymers such that the apparatus 100 can be compacted and easily stored and/or transported. The top portion 1020 of the housing 102 can be a collar which extends upwards from the bottom portion 1022. The bottom portion 1022 can extend radially from the top portion 1020 to provide a pad for the pet to stand on and provide structural support for the top portion 1020. Both the top portion 1020 and the bottom portion 1022 can be made from plastics and/or fabrics. In at least one example, the top portion 1020 and the bottom portion 1022 are made from the same material. In other examples, the top portion 1020 and the bottom portion 1022 are made from different materials. Both the top portion 1020 and the bottom portion 1022 are flexible such that the housing 102 can be folded for easy storage and transportation.

Frames 20, for example as illustrated in FIG. 4, are coupled with the top portion 1020 to provide apertures 104 through which the toggles 180 of the panels 150 can pass through. Additionally, the frames 20 provide structural support for the toggles 180 to abut against to maintain the positioning of the panels 150.

Figure 5A:
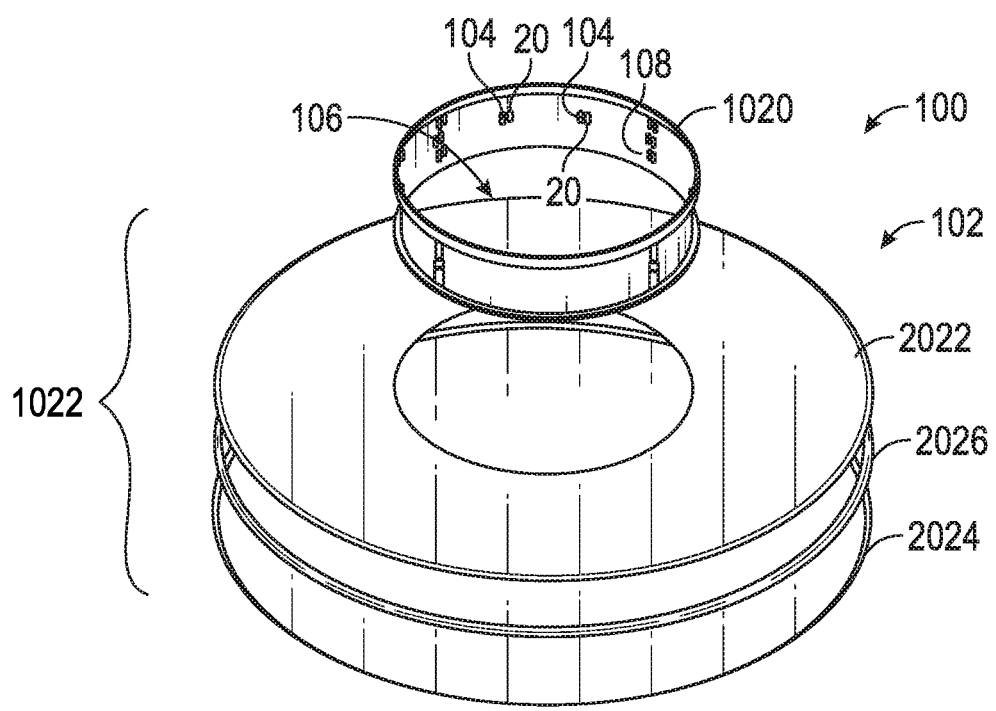
FIG. 5A is an exploded view of a second example of a pet apparatus.
Figure 5B:
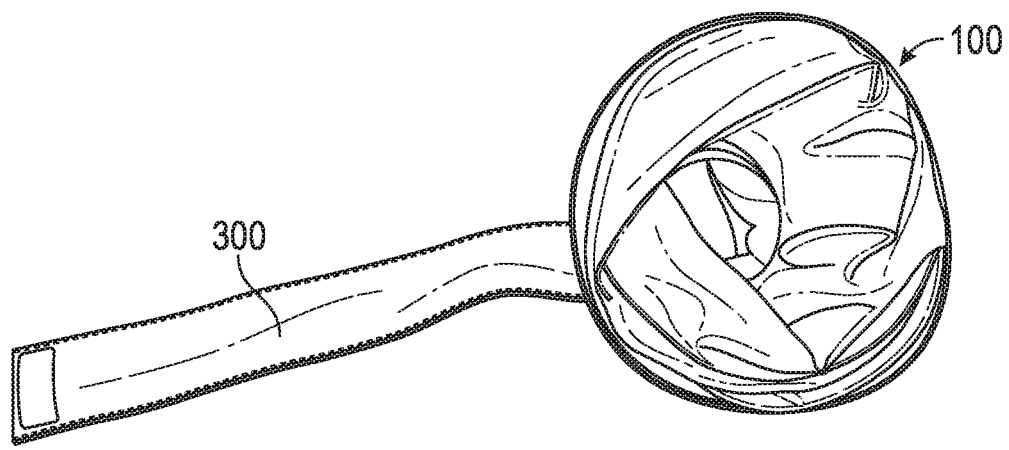
FIGS. 5B-5G illustrate multiple configurations of the second example of the pet apparatus.
Figure 5C:
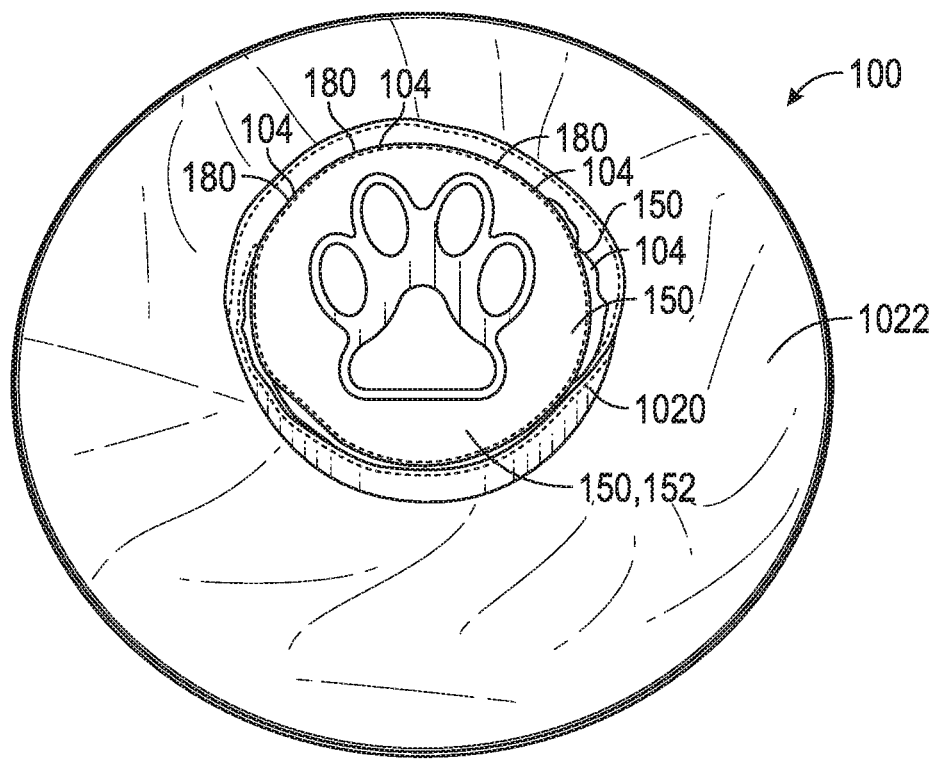
Figure 5D:
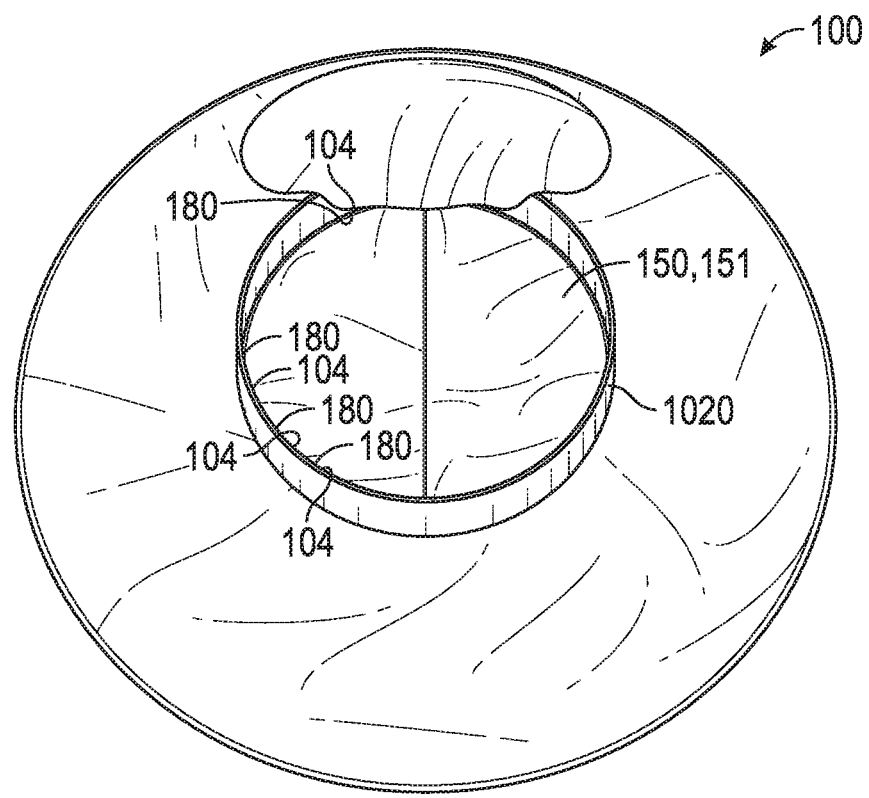
Figure 5E:
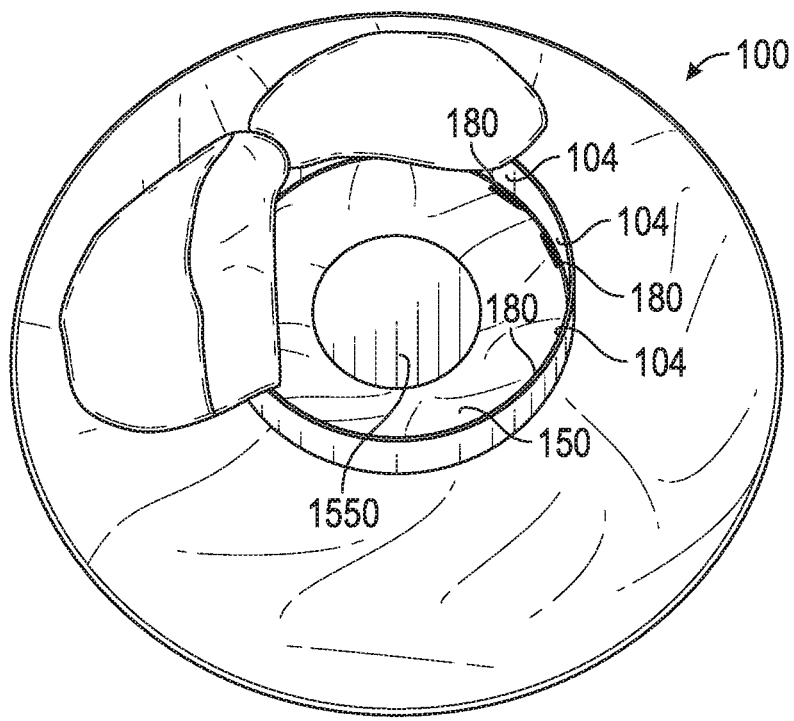
Figure 5F:
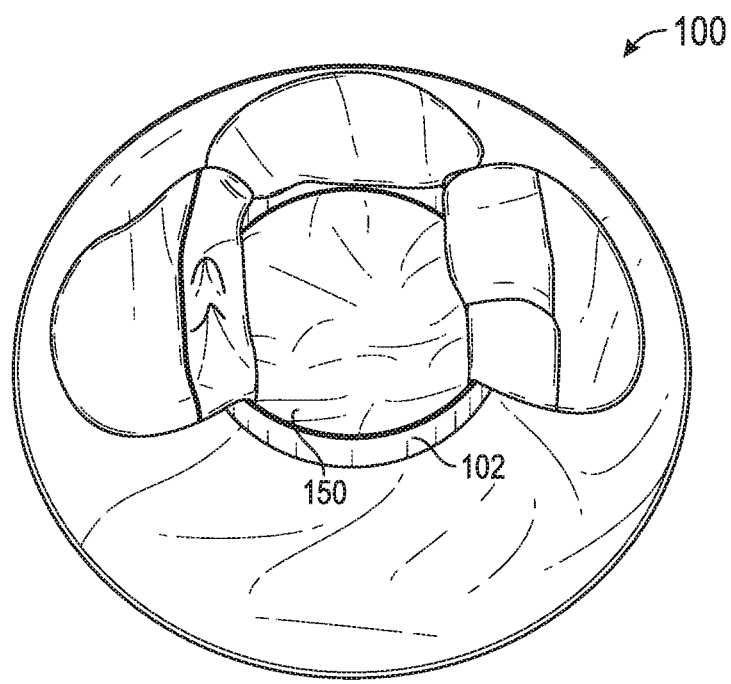
Figure 5G:
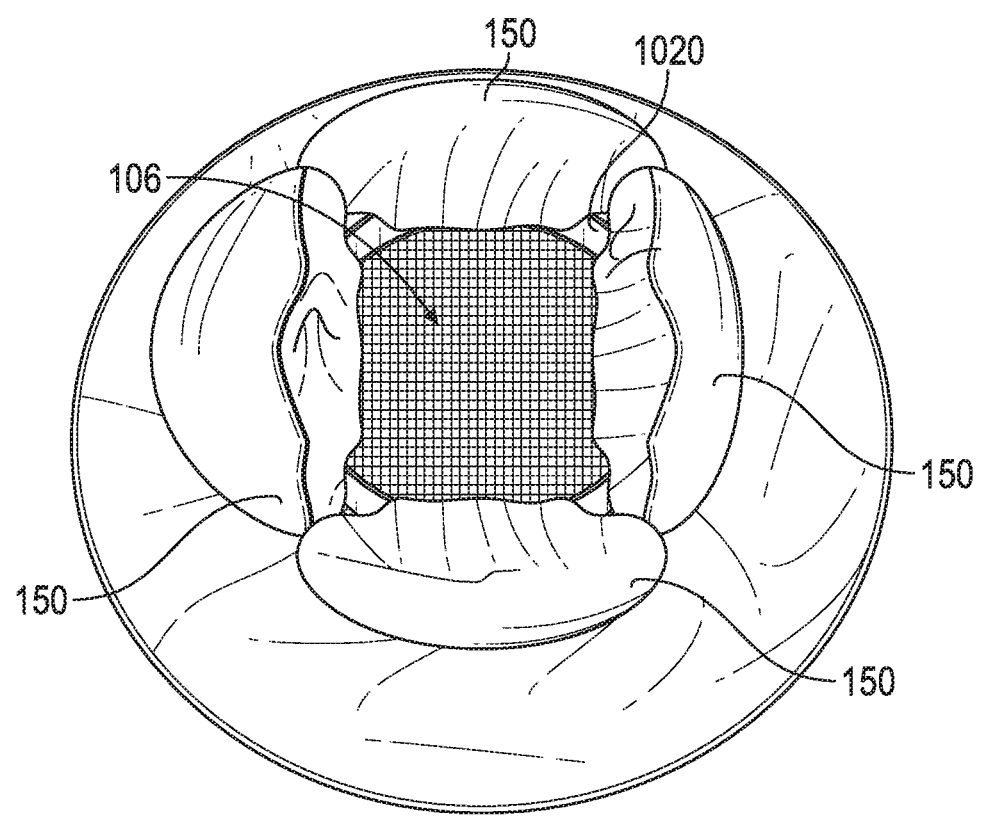

The bottom portion 1022 can include a top piece 2022 and a bottom piece 2024. The top piece 2022 and the bottom piece 2024 can be coupled together, for example by sewing. In at least one example, the bottom portion 1022 is one singular piece of material. An collapsible ring 2026 can be disposed within and coupled to the top piece 2022 and the bottom piece 2024. With the collapsible ring 2026, the apparatus 100 can be folded and stored such that the apparatus 100 has a smaller footprint, for example, as illustrated in FIG. 5B. In at least one example, the apparatus 100 can include a wrap 300 which can maintain the apparatus 100 in the folded configuration. Additionally, with the collapsible ring 2026, the apparatus 100 expands to an original shape when there are no external forces enacted on the apparatus 100. The collapsible ring 2026 is also able to assist in removing wrinkles from the bottom portion 1022 of the housing 102. The collapsible ring 2026 can be made of metal, plastic, rubber, or any other suitable material such that the collapsible ring 2026 can be collapsed and/or folded with force and springs to an original shape when the force is removed.

FIGS. 5C-5G illustrate the apparatus 100 with four panels 150 installed in a plurality of layers. As shown in FIGS. 5C-5G, the four panels 150 can be installed in a plurality of orientations and can have a plurality of configurations of pockets 1500. The orientation and configurations of the panels 150 as illustrated in FIGS. 5C-5G are exemplary, and the user can install the panels 150 in any desired orientation and/or configuration such that the pet is mentally and physically stimulated. Additionally, any number of panels 150 can be installed so long as apertures 104 are available.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A pet apparatus comprising:
a housing including internal walls forming a cavity, the internal walls including a plurality of apertures arranged in at least one row;
one or more panels disposed within the cavity, each of the panels including at least one pocket configured to receive a toy or a treat;
a plurality of toggles coupled with each of the one or more panels, the toggles configured to be inserted into the plurality of apertures to removably couple the one or more panels with the housing, wherein the plurality of toggles are arranged around less than half of a perimeter of each of the one or more panels.

2. The pet apparatus of claim 1, wherein the one or more panels, when coupled with the housing, are layered on top of one another.

3. The pet apparatus of claim 1, wherein the at least one pocket includes at least one of a single pocket and a double pocket.

4. The pet apparatus of claim 3, wherein the single pocket includes a single flap forming a single opening.

5. The pet apparatus of claim 3, wherein the double pocket includes a first flap forming a first opening and a second flap forming a second opening facing a direction opposite the first opening, wherein the first flap at least partially overlaps the second flap.

6. The pet apparatus of claim 1, wherein at least one of the one or more panels includes a screen such that the inside of the pocket is visible.

7. The pet apparatus of claim 1, wherein at least one toggle of the plurality of toggles includes an extension and an arm, wherein the length of the arm is greater than the width of the arm.

8. The pet apparatus of claim 7, wherein the arm is substantially cylindrical, substantially pill shaped, or a rectangular prism.

9. The pet apparatus of claim 8, wherein the respective lengths of the plurality of apertures are less than the length of the arm.

10. The pet apparatus of claim 9, wherein length of the apertures are 0.75 times the size of the length of the arm.

11. The pet apparatus of claim 9, wherein the length of the apertures are 13.48 mm, and the length of the arm is 18.25 mm.

12. The pet apparatus of claim 1, wherein the plurality of apertures are substantially pill shaped.

13. The pet apparatus of claim 1, wherein the plurality of apertures have a middle section and two opposing end sections, wherein the middle section has a width smaller than widths of the two opposing end sections.

14. The pet apparatus of claim 1, wherein the at least one row is a plurality of rows.

15. The pet apparatus of claim 1, wherein each of the one or more panels is coupled with four toggles of the plurality of toggles.

16. The pet apparatus of claim 1, wherein the one or more panels are made of fabric.

17. The pet apparatus of claim 1, wherein the housing is made of plastic.

18. The pet apparatus of claim 1, wherein the housing is made of fabric.

19. The pet apparatus of claim 18, wherein the housing is foldable.

20. The pet apparatus of claim 19, wherein the housing includes a collapsible ring, wherein, when the housing is unfolded, the collapsible ring springs to an original shape.

* * * * *